(No Model.) 6 Sheets—Sheet 1.
W. A. JOHNSTON & A. W. BROWNE.
GAS ADMINISTERING APPARATUS.
No. 601,057. Patented Mar. 22, 1898.
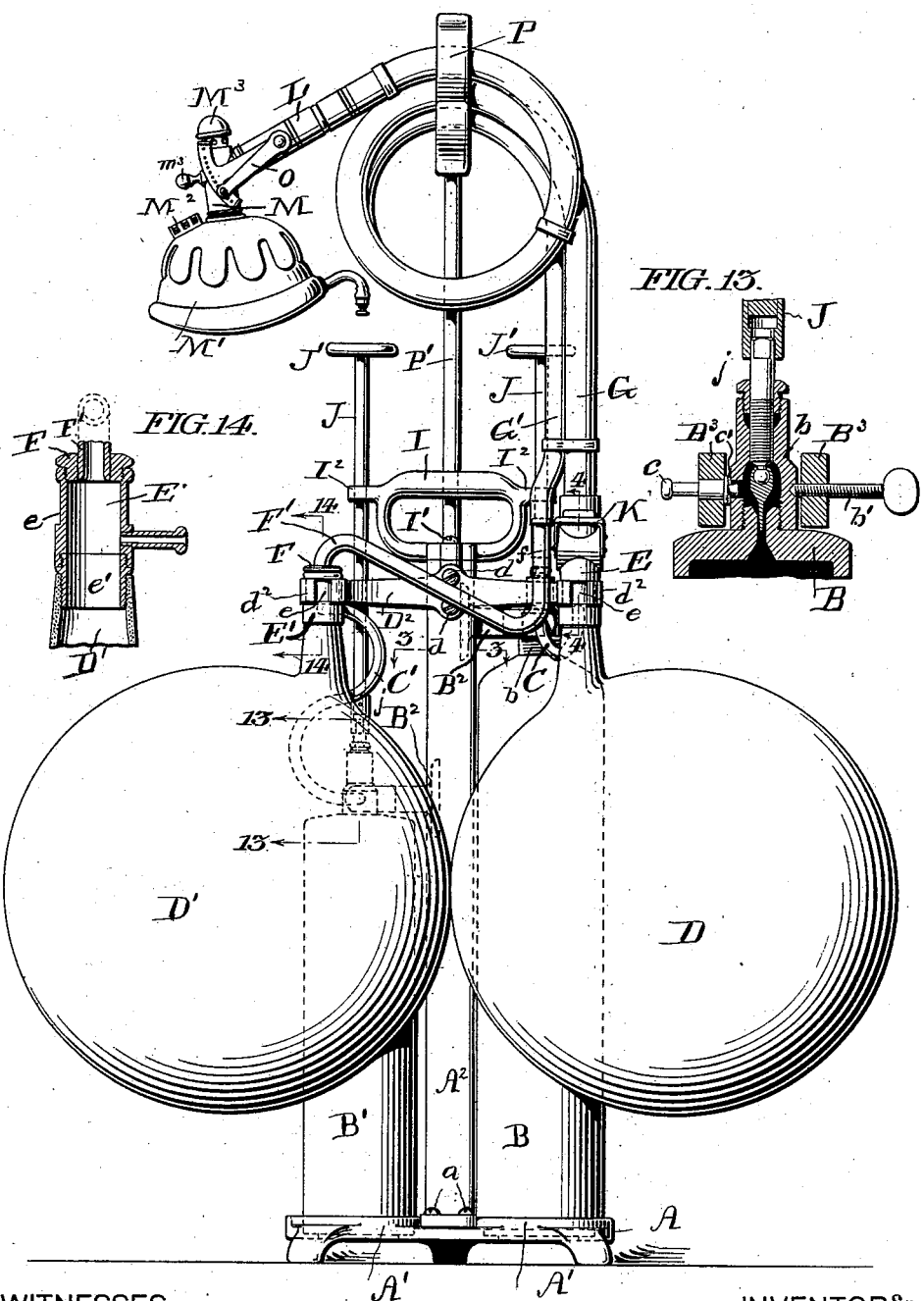

(No Model.) 6 Sheets—Sheet 2.
W. A. JOHNSTON & A. W. BROWNE.
GAS ADMINISTERING APPARATUS.
No. 601,057. Patented Mar. 22, 1898.
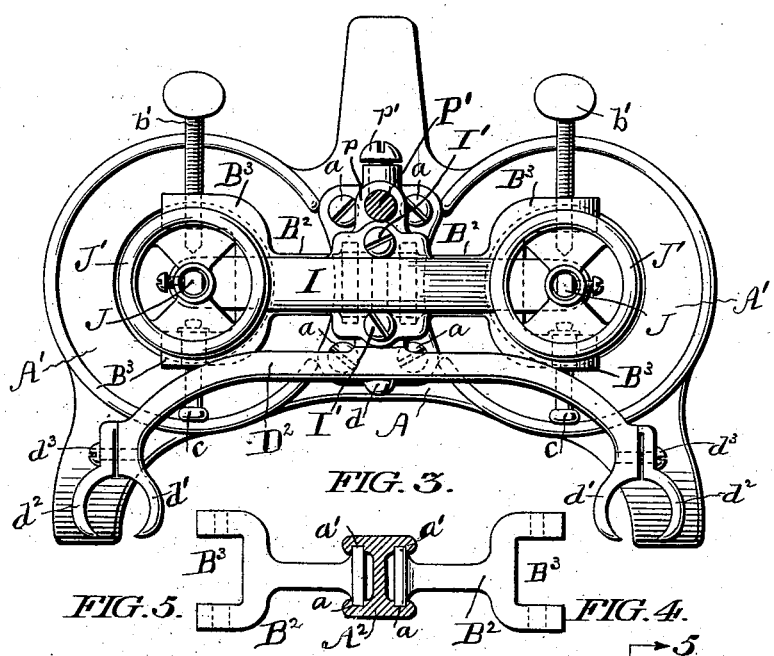
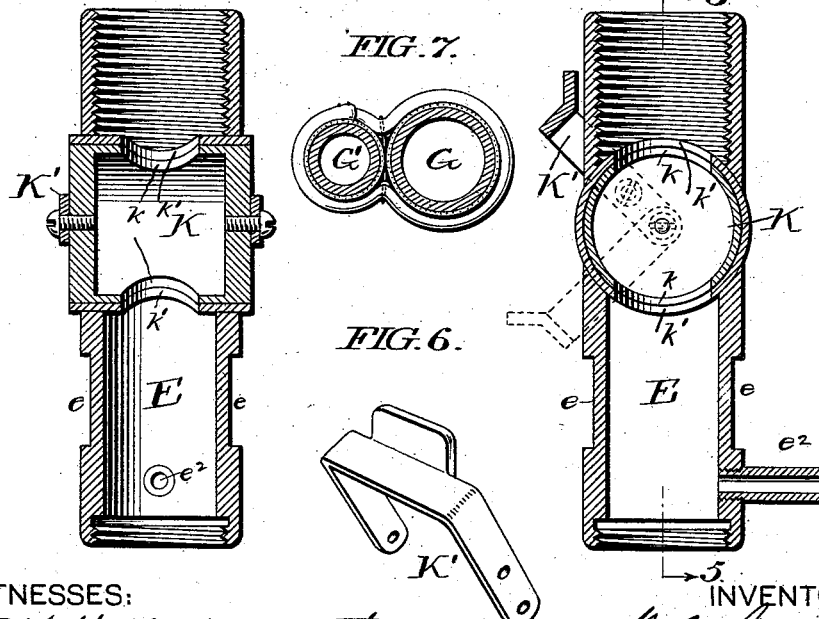
WITNESSES: INVENTORS:

(No Model.) 6 Sheets—Sheet 3.
W. A. JOHNSTON & A. W. BROWNE.
GAS ADMINISTERING APPARATUS.
No. 601,057. Patented Mar. 22, 1898.
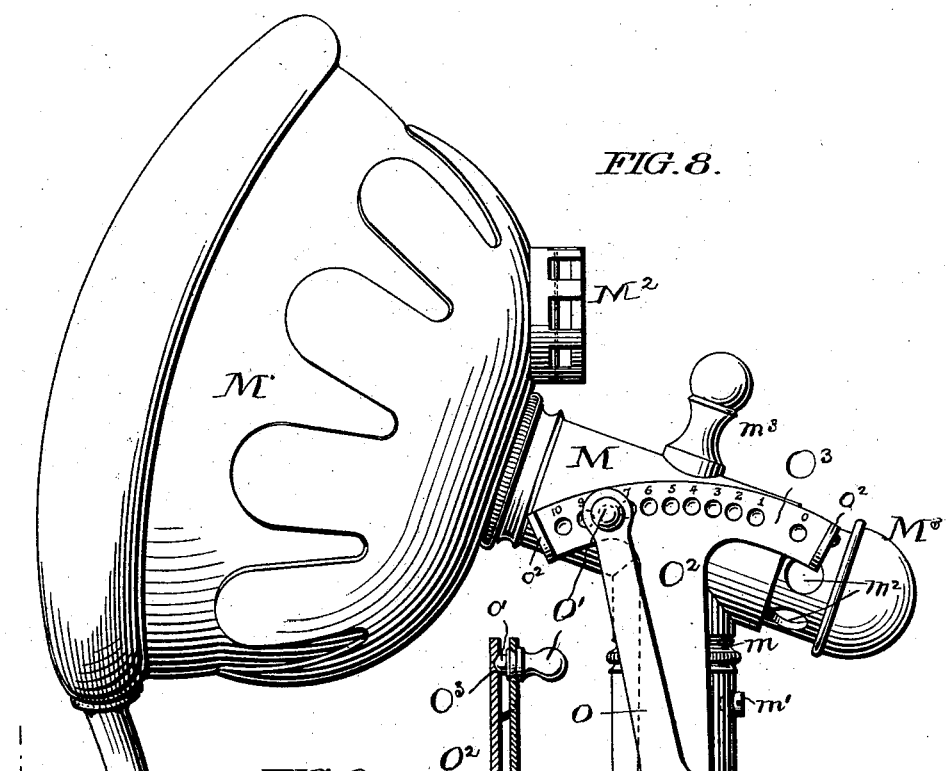
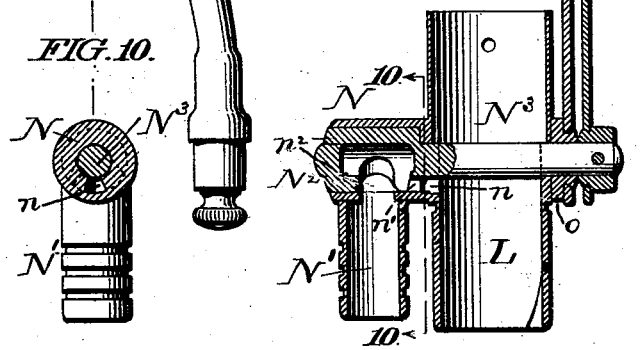
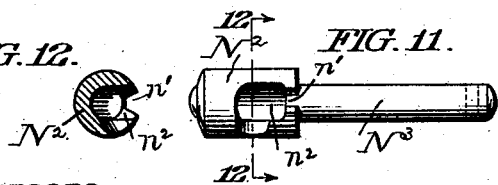
WITNESSES:
M. W. Hollingsworth
Edw. F. Simpson, Jr.
INVENTORS:
W. A. Johnston
A. W. Browne
By Atty J. A. Peyton

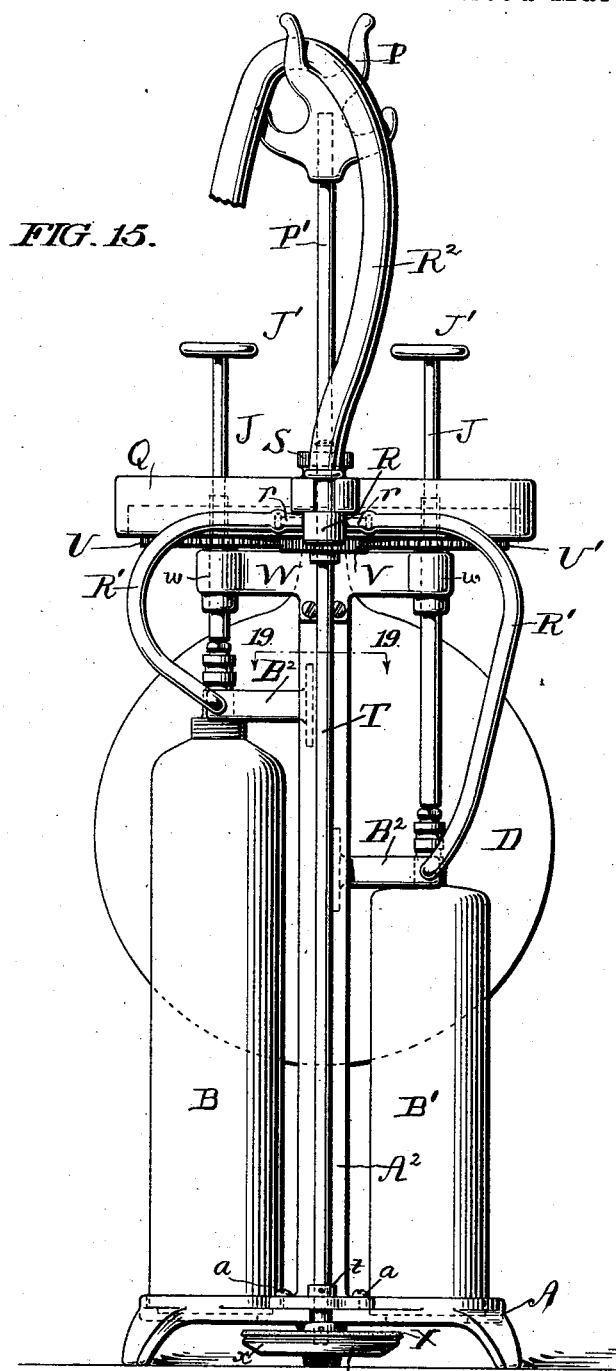

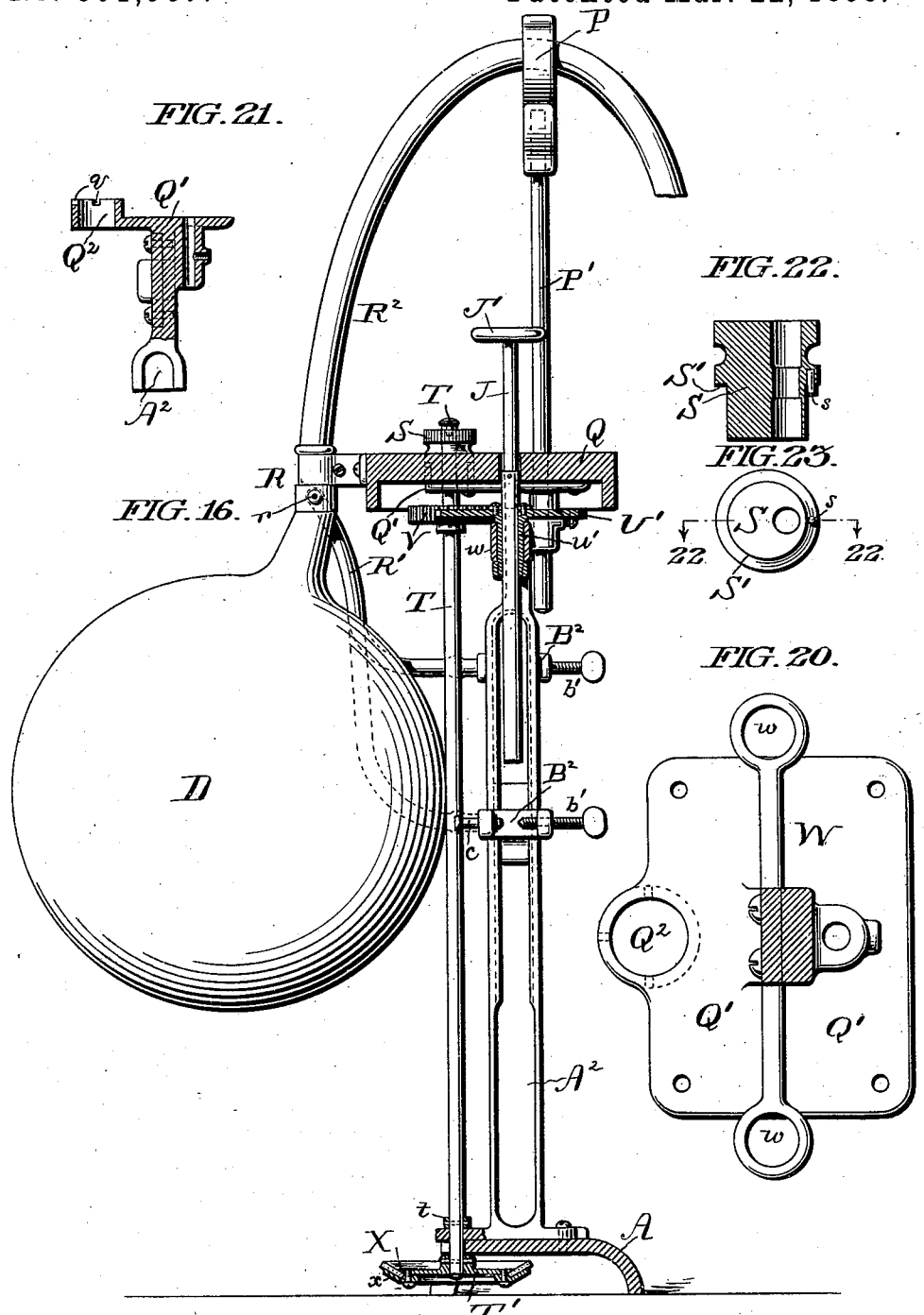

(No Model.) 6 Sheets—Sheet 6.

W. A. JOHNSTON & A. W. BROWNE.
GAS ADMINISTERING APPARATUS.

No. 601,057. Patented Mar. 22, 1898.

WITNESSES: INVENTORS:

UNITED STATES PATENT OFFICE.

WILLIAM A. JOHNSTON AND ARTHUR W. BROWNE, OF PRINCE'S BAY, NEW YORK, ASSIGNORS TO THE S. S. WHITE DENTAL MANUFACTURING COMPANY, OF PHILADELPHIA, PENNSYLVANIA.

GAS-ADMINISTERING APPARATUS.

SPECIFICATION forming part of Letters Patent No. 601,057, dated March 22, 1898.

Application filed August 13, 1896. Serial No. 602,631. (No model.)

*To all whom it may concern:*

Be it known that we, WILLIAM A. JOHNSTON and ARTHUR W. BROWNE, citizens of the United States, residing at Prince's Bay, in the county of Richmond and State of New York, have invented certain new and useful Improvements in Gas-Administering Apparatus; and we do hereby declare the following to be a full, clear, and exact description of the invention, such as will enable others skilled in the art to which it appertains to make and use the same.

Our invention relates to certain improvements, as hereinafter claimed, in apparatus of the class employed for administering gases—such as nitrous oxid, oxygen, &c.—by dentists, surgeons, and physicians.

Figure 17:
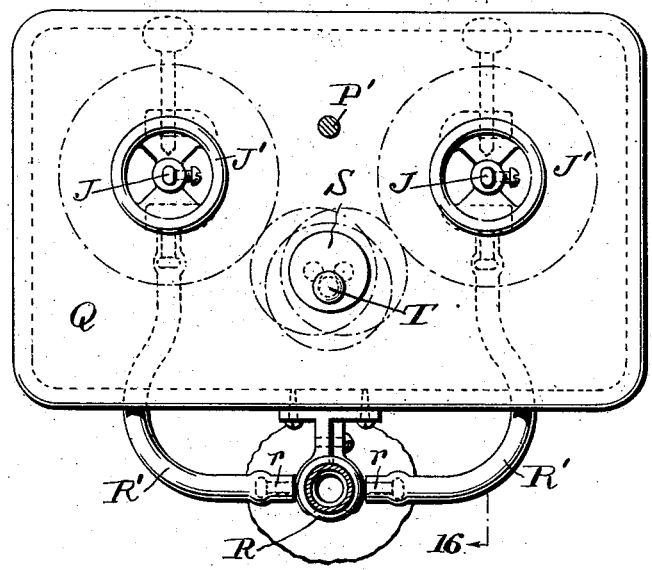
Figure 18:
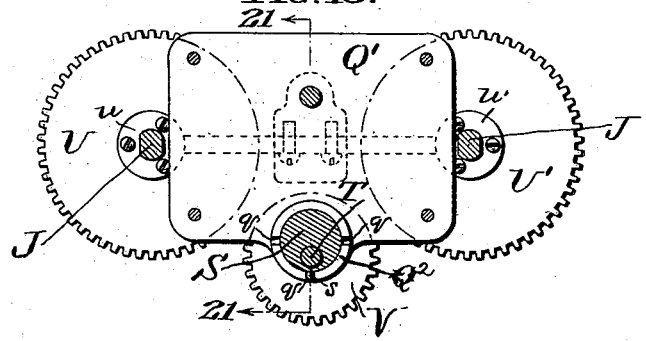
Figure 19:
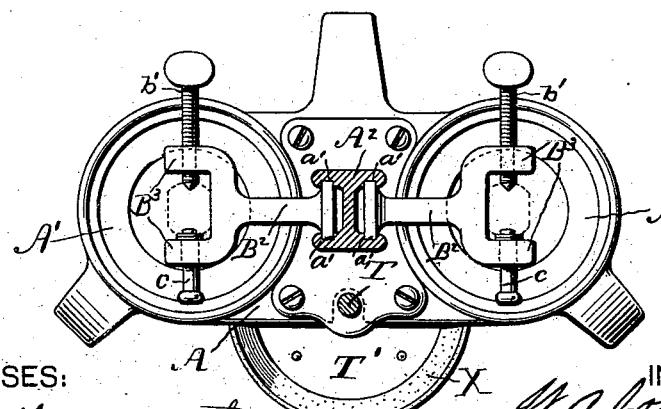

In the accompanying drawings, which show suitable embodiments of our improvements, Figure 1 is an elevation of the apparatus; Fig. 2, a plan view of parts of the apparatus with the gas-receivers and their attachments omitted and the rod of the support for the inhaler in section; Fig. 3, a section on the line 3 of Fig. 1. Fig. 4 is an enlarged view in section on the line 4 of Fig. 1; Fig. 5, a view in section at a right angle to Fig. 4, and Fig. 6 a perspective view of the handle of the valve for governing flow of gas from a receiver to the inhaler-tube. Fig. 7 shows one of the double rings for connecting the two inhaler-tubes. Fig. 8 is a view in elevation of the inhaler and adjacent parts of the apparatus; Fig. 9, a section showing the connection of the tubes by which gas passes to the inhaler, with the valve mechanism by which flow of gas by one of the tubes may be controlled; Fig. 10, a view, partly in elevation and partly in section, on the line 10 of Fig. 9; Fig. 11, a longitudinal view of the valve shown in Figs. 9 and 10; Fig. 12, a section on the line 12 of Fig. 11. Fig. 13 is a detail view, in vertical central section, showing the connection between the neck of a gas-holder and its supporting-arm and outlet-tube. Fig. 14 is a section on the line 14 of Fig. 1, showing details of construction. Figs. 15 to 23 show modifications. In these views Fig. 15 is an elevation of the apparatus with the inhaler omitted; Fig. 16, a view, partly in elevation at a right angle with Fig. 15 and partly in vertical section in different planes, one of which is indicated by the line 16 of Fig. 17; Fig. 17, a plan view with parts in section and the gas-receiver broken away; Fig. 18, a view showing the gearing and the carrier for a gearing-cover portion of the stand in plan and some other parts in horizontal section; Fig. 19, a view showing some parts in plan with the stand in section on the line 19 of Fig. 15; Fig. 20, an inverted plan view of the gearing-cover carrier with the stand-upright in section; Fig. 21, a view showing parts in section on the line 21 of Fig. 18. Figs. 22 and 23 show the gearing-controlling eccentric, Fig. 22 being a section on the line 22 of Fig. 23.

A suitable stand A has its base provided with sockets or receptacles A' A' for two strong metallic gas-holders B B', shown as of cylindrical form. An upright $A^2$ of the stand is firmly secured at its lower end to the stand-base by screws $a$ and is provided with two vertical guideways $a'$ $a'$, adjustably engaged by the inner ends of two arms $B^2$ $B^2$, which are provided with forked outer ends $B^3$ $B^3$, for engagement with the necks $b$ $b$ of the gas-holders B B', so as to support the holders in upright position. Each supporting-arm $B^2$ has one of its forks $B^3$ provided with a set-screw $b'$ for engaging a socket or recess in the neck of a gas-holder, and its other fork carries an outlet tube or nipple $c$, adapted to have a rubber tube C or C' connected to its outer end and to engage at its inner end with an opening in the holder-neck above the seat of a suitable valve in the neck. One or more washers $c'$, of rubber or other suitable material, serve to make a tight joint about the nipple at its connection with the neck-opening to prevent leakage of gas.

As will be understood by reference to Figs. 1 and 13, when the holders are seated upon the stand-base and the supporting-arms properly adjusted in their guideways in the stand-upright to bring them into position for engagement with the holder-necks proper engagement of the outlet-nipples with the necks of the holders is made by turning the adjusting-screws, which force the inner ends of the nipples into the neck-openings and compress the washers around the nipples against the holder-necks to prevent leakage of gas and allow of its escape only through or by way of the nipples. It will be seen that gas-holders of varying lengths may be employed by providing for the free adjustment of the supporting-arms. By making one or both of the base-sockets A' stepped, so as to provide different-sized sockets, (see dotted lines, Fig. 1,) gas-holders of varying diameters may be properly supported.

Gas-receivers D D', one for connection with each holder, charged with gas under high pressure, are of suitable construction to adapt them to expand and collapse, as usual in apparatus of this class, and each has supporting connection with the stand, so as to be movable about with it. This supporting connection for the receivers is shown as consisting of a yoke-like arm $D^2$, secured midway its length to the stand-upright by screws $d$ and adapted to carry the receivers at its opposite ends in sockets or forks, each consisting of a fixed member $d'$ and a movable member $d^2$, adjustably connected with the fixed member by a screw $d^3$. Each receiver is provided with a metallic coupling-tube having an annular recess $e$ for engagement by the forked ends of the supporting-arm $D^2$. The mouths of the gas-receivers have attached to them in well-known way externally-threaded collars, one of which is shown at $e'$, Fig. 14, to which their respective coupling-tubes E E' are screw-fitted. The coupling-tube E of the receiver D is valved, as to be farther on in detail described, and a nipple $e^2$ serves for connecting the tube C, leading from the gas-holder B, so that gas may be allowed to flow from the holder to the receiver. The coupling-tube E' of the receiver D' is provided with a nipple for attachment of the tube C', by which gas is supplied from the holder B'. A screw-cap F of the coupling-tube E' is centrally perforated through its top and is provided with a metallic outlet-tube F', tightly fitting its perforation, bent as shown, and having a rubber tube G' connecting with its upwardly-projecting outer end $f$ and leading to a suitable inhaler, as in turn to be described.

The coupling-tube E of the receiver D is internally threaded at its upper end for engagement with a rubber tube G, leading to the inhaler, the connection between the coupling-tube and rubber tube being by means of a screw-collar in well-known way.

The supporting-stand is provided with a handle I, attached to the upper end of the stand-upright by screws I'. By means of the handle the apparatus may be lifted and moved as desired. This handle is made the medium by which keys for controlling the valves in the gas-holder necks have adjustable supporting connection with the stand, the handle being provided with perforated lugs $I^2 I^2$, through which pass rods J J. Handwheels J' J' are provided at the upper ends of the vertically-adjustable valve-controlling rods, so as to be easily accessible, and these rods have sockets at their lower ends by which they are adapted to serve as keys or wrenches for engaging the stems of the valves, as will readily be understood. The engagement of one of the controlling key-rods with a valve-stem is shown at $j$, Figs. 1 and 13.

To regulate and shut off the passage of gas to the inhaler by way of the tube G and the coupling E, by which it is connected with the receiver D, this coupling is provided with a suitable valve, the oscillating plug K of which is provided with a controlling-handle K', by means of which the plug ways or openings $k$ may be caused to fully or partially register with the ways $k'$ of the plug-seat or be moved into position entirely out of register therewith.

The connection of the gas-conveying tubes G G' with the inhaler is by way of a connecting-tube L. The tube G terminates at its upper end in a metallic coupling L', within which is fitted the split expansible lower end of the connecting-tube L, the upper end of which is detachably engaged with the tubular body portion M of the inhaler by way of a branch pipe $m$ thereof projecting into the connecting-tube and secured by a screw $m'$. The tubular body portion of the inhaler M is connected with the face-piece M', having an exhalation-valve at $M^2$, and is provided with a sliding section $M^3$, having air-inlet openings $m^2$ and with the handle $m^3$, all of well-known construction. The connecting-tube L is provided with a branch tube N, having the coupling N' for engagement with the upper end of the tube G' in well-known way. Valve mechanism by which to govern or entirely shut off the passage of gas by way of the tube G' to the inhaler is provided as follows: A valve-plug $N^2$, adapted to oscillate in the branch N of the connecting-tube, is provided with a stem $N^3$, passing through the connecting-tube and actuated by a lever O, provided at its upper end with a finger knob or handle O'. The branch tube N constitutes the valve-plug casing or seat, and there is a way or opening $n$ between the connecting-tube and its branch, adapted to be opened and closed by the valve which is formed with the angular way $n'$ $n^2$. The part $n'$ of the valveway is adapted to communicate with the way $n$, and the valveway portion $n^2$ is adapted for communication with the coupling N' of the gas-supply tube G'. It will readily be seen that by means of the controlling-lever the flow of gas to the connecting-tube may be regulated as desired or entirely cut off.

A gage or indicator is supported adjacent to the tubular body portion of the inhaler by an arm $O^2$, rigidly attached to the connecting-tube by way of a lug or boss $o$, fixed to this tube and through which the valve-stem passes. The indicator consists of the graduated plate $O^3$, curved concentrically with the valve-stem. The controlling-lever of the valve is adapted to be engaged with the indicator-plate at the desired point by means of a lug $o'$, constituted by the inner end of the handle-piece or knob, which may enter any one of the holes or notches numbered from the zero-point (0) up to 10, opposite which it may be presented. The spring of the lever permits of ready disengagement of the lug from a hole in the indicator-plate and serves to frictionally lock the lever in its position of adjustment, with its lug engaging a hole in the plate. With the lever engaging the zero-hole in the indicator the valve is entirely closed and when engaged with the hole 10 the fullest supply of gas is admitted. The supply is gradually diminished as the lever is moved from the hole 10 toward the zero-point, the smallest amount of gas which can be admitted being when the lever-lug is engaged with hole 1. Movement of the lever in opposite directions is limited by the stops $o^2$ at the ends of the indicator.

The inhaler and the tubes G G' are supported when not in use by a suitable rest P at the upper end of a rod P', which has vertically adjustable and detachable connection with the stand by means of a lug $p$ on the upright thereof, provided with a bearing-opening in which the rod may be slid up and down and clamped by a set-screw $p'$.

From the above description it will be seen that the gas-receivers may be properly supplied with gas from the gas-holders and the flow of gas to them shut off by turning movements of the hand-wheels controlling the valves of the holders; that the anesthetic—say nitrous oxid—may be administered to a patient by way of the inhaler in quantity as desired, the amount administered being controlled by the valve in the coupling-tube E; that oxygen may be administered in nicely-controlled amount along with or independently of the nitrous oxid, and that in event of a patient being dangerously affected by the administration of the anesthetic its injurious effects may quickly be overcome by administering oxygen in proper quantity. It will further be seen that the inhaler may be moved independently of the gas receiver or receivers which are supported in fixed relation to the stand and that the operator is thus relieved of the weight of the gas receiver or receivers.

It will be understood that the apparatus may be employed for administering an anesthetic only or oxygen only, an obvious advantage of such employment being that with one gas-holder in position for use the other might be removed for recharging. Obviously some of the advantages and novel features of our improvements would be retained were the stand adapted to support but one gas-holder at a time with a receiver and the coöperating apparatus for the single holder and receiver.

In the modified apparatus shown in Figs. 15 to 23 two gas-holders B B' and one gas-receiver D are employed, both holders being charged with the same kind of gas, this modified apparatus not being adapted for the use of different gases at the same time. The valve-controlling key-rods J pass through a protecting-cover Q of the stand and through the hubs of gear-wheels farther on to be described. Each key-rod is made in detachably-connected parts, so that the upper part, with its hand-wheel, may be removed to be out of the way when desired, as will be understood by reference to Fig. 16. The mouth coupling-tube R of the receiver is provided with two nipples $r\ r$ for making connection by flexible tubes R' R' with the necks of the gas-holders, and the flexible tube $R^2$ for flow of gas to a suitable inhaler is connected with the receiver-mouth coupling-tube.

The valves in the necks of the gas-holders are adapted to be actuated by the foot in the following way: A carrier Q' for the gearing-cover portion Q of the stand is shown as formed with the stand-upright, and the cover portion is detachably secured to this carrier by screws. The carrier is provided with an eccentric-bearing $Q^2$, provided with three notches $q$ in its upper end. An eccentric S is fitted to turn in the bearing and is upheld therein by its annular shoulder S'. A pin $s$, projecting downwardly from the eccentric-shoulder, is adapted to engage with the desired one of the notches in the bearing to hold the eccentric in the desired position of adjustment. The eccentric is milled at its upper end for engagement by the fingers and is fitted upon the upper end of a rod T, so as to be capable of sliding thereon. This rod at its lower end is provided with a foot-actuated wheel T'. The rod is mounted near its lower end in a suitable bearing in the stand-base and is upheld by a collar $t$, secured to it above its bearing. The valve-controlling rods J J pass through the hubs $u\ u'$ of gears U U', the lower part of each rod being flattened to engage with the hub of its respective gear, so as to cause the rod to partake of the turning movement of the gear. An intermediate or actuating gear V is secured to the rod T between the gears U U', the hubs of which are mounted to turn in bearings $w\ w$, provided at the opposite ends of an arm W, constituting a part of the stand, this arm being secured by screws to the stand-upright.

The foot-actuated wheel is suitably constructed to present a frictional engagement with the foot, being shown as provided with the inclined rubber ring X, attached to its periphery by a clamp-ring $x$, as will be apparent. The rod T has sufficient lateral play in its bearing in the stand-base to permit of being slightly inclined.

From the above description it will be seen that with the actuating-gear in the position in which it is represented in Fig. 18 out of engagement with both of the gears U U' no movement can be imparted to either of the valve-controlling key-rods by the foot. At such times these rods may be freely actuated by hand to control the gas-holder valves. By proper adjustment of the eccentric to the right or to the left the actuating-gear is caused to engage with the desired one of the gears U U' for turning one or other of the key-rods by movement of the foot-wheel.

We claim as our invention—

1. The stand for gas-administering apparatus, having the base provided with a receptacle for a gas-holder, the upright provided with a guideway, and a supporting-arm adjustable in said guideway for engagement with the gas-holder neck, substantially as and for the purpose set forth.

2. The stand for gas-administering apparatus, having the base provided with the receptacles for gas-holders, the upright provided with the guideways, and the supporting-arms adjustable in said guideways for engagement with the necks of the gas-holders, substantially as and for the purpose set forth.

3. The combination, in gas-administering apparatus, of the stand having its base provided with a receptacle and the upright provided with a guideway, a gas-holder provided with the valved neck and resting in the stand-receptacle, a supporting-arm adjustable at its inner end in said guideway and provided at its outer end with forks for engagement with the gas-holder neck, the outlet-nipple carried by one of said forks for engaging an opening in the gas-holder neck, and the set-screw carried by the other fork for engaging the gas-holder neck, substantially as and for the purpose set forth.

4. The combination in gas-administering apparatus, of the stand, gas-holders supported thereby and provided with a valved neck, a gas-receiver, the coupling-tube attached to the mouth of the receiver, an arm connected with the stand and engaging the coupling-tube for supporting the receiver in fixed relation to the stand, an inhaler movable independently of the receiver, the flexible tube connected with the coupling-tube of the receiver for supplying gas to the inhaler, and the communicating tube between the gas-holder neck and the coupling-tube of the receiver, substantially as and for the purpose set forth.

5. The combination, in gas-administering apparatus, of the stand, a gas-holder supported thereby and provided with a valved neck, a gas-receiver having supporting connection with the stand, a tube by which communication is made between the gas-holder neck and the mouth of the gas-receiver, and the key provided with a rod having vertically-adjustable supporting connection with the stand and adapted to engage the stem of the valve in the gas-holder neck to turn on and off the flow of gas to the receiver from the holder by way of their communicating tube, substantially as and for the purpose set forth.

6. The combination, in gas-administering apparatus, of the stand having the upright provided at top with the handle, a gas-holder supported by the stand and provided with the valved neck, the rod having vertically-adjustable supporting connection with the handle of the upright and provided with the key adapted to engage the stem of the valve in the gas-holder neck, the hand-wheel on the key-rod above the handle, a gas-receiver having supporting connection with the stand, and a tube by which communication is made between the gas-holder neck and the mouth of the gas-receiver, substantially as and for the purpose set forth.

7. The combination, in gas-administering apparatus, of the stand, the gas-holders supported thereby and provided with the valved necks, the gas-receiver having supporting connection with the stand, tubes by which communication is made between the necks of the gas-holders and the mouth of the gas-receiver, the key-rods adapted to actuate the valves in the necks of the gas-holders, the gears for turning the key-rods, the actuating-gear, its rod adapted to be turned by foot, and the eccentric through which the actuating-gear rod passes and adapted to be turned and secured in different positions, substantially as and for the purpose set forth.

In testimony whereof we affix our signatures in presence of two witnesses.

WILLIAM A. JOHNSTON.
ARTHUR W. BROWNE.

Witnesses:
SEYMOUR CASE,
M. A. COLE.